April 14, 1953     H. E. DYCHE, JR     2,635,152

STALL WARNING APPARATUS FOR AIRPLANES

Filed June 1, 1948

WITNESSES:
Robert C. Baird

INVENTOR
Howard E. Dyche, Jr.
BY G. W. Crawford
ATTORNEY

Patented Apr. 14, 1953

2,635,152

UNITED STATES PATENT OFFICE 2,635,152

STALL WARNING APPARATUS FOR AIRPLANES

Howard E. Dyche, Jr., Pittsburgh, Pa., assignor to Westinghouse Electric Corporation, East Pittsburgh, Pa., a corporation of Pennsylvania Application June 1, 1948, Serial No. 30,308

13 Claims. (Cl. 200—81.9)

My invention relates, generally, to indicators or warning apparatus and, more particularly, to stall warning apparatus for use on airplanes to warn the pilot of an incipient stall condition by means of visible and/or audible signals.

It is known that under normal conditions of flight the flow of air over the upper surface of the wing is smooth or laminar except for the relatively thin boundary layer of air at the wing surface and that under an incipient stalling condition the laminar flow of air changes to a turbulent flow. This turbulence starts at the trailing edge of the wing and travels in general forwardly as the stalling condition becomes more pronounced.

Systems and devices of various kinds have been employed to warn the pilot of an incipient stalling condition. Some of these devices operate at a definite angle of attack of the wing and are of a mechanical nature. Others of these devices operate in response to air flow conditions over the upper surface of the wing and particularly to a change in pressure differential produced by a suitable device which responds to the air flow conditions. It is to this latter type of system or device that my invention is directed.

Accordingly, it is an object of my invention, generally stated, to provide stall warning apparatus for airplanes which shall be of simple and economical construction, reliable and accurate in operation, and which shall not be materially affected by changes in ambient temperature, vibration, or the position in which the apparatus is operated.

A more specific object of my invention is to provide apparatus of the character described which shall function in accordance with a predetermined change in the nature of the air flow over the upper surface of the wing.

A further object of my invention is to provide apparatus of the character described in which the warning device is controlled by means of a switch device embodying a control switch actuated by the expansion and contraction of a continuously heated expansible member, the operating temperature of which is varied or controlled in accordance with a pressure differential determined by air flow conditions over the upper trailing surface of a wing of the plane.

Another object of my invention is to provide apparatus of the character described wherein the control switch is actuated by a continuously heated expansible member in the form of a wire, the temperature of which is varied by means of a heat dissipating member actuated into and out of heat dissipating relation with respect to the wire in accordance with variations in pressure differential.

A still further object of my invention is to provide, in a system of the character described, for controlling the operating temperature of the expansible wire by means of an insulated heat dissipating bar member carried by a sensitive bellows or other pressure responsive device, which is responsive to variations in pressure differential.

Another object of my invention is to provide a stall detector for use in stall warning systems which is adapted to be mounted on the wing of the plane and which is responsive to air flow conditions over the upper surface thereof and wherein a control switch is operated by a continuously heated expansible wire controlled by a bellows actuated heat-dissipating member.

Another object of my invention is to provide a switch device for use in stall systems in conjunction with a device for producing a pressure differential wherein a control switch for the warning device is actuated by a continuously heated expansible member, the operating temperature of which is varied by heat dissipating means actuated into and out of heat dissipating relation with the wire in response to variations in pressure differential.

These and other objects of my invention will become more apparent from the following detailed description of a particular embodiment thereof when considered in connection with the drawing, in which.

In practicing my invention, the control switch, which controls the energization of the warning or signalling device or devices, which may be in the form of a lamp or horn, or both, from a battery or other source of current on the plane, is actuated by an expansible wire which is continuously heated by the passage of a constant current therethrough. The control switch is actuated to its open or closed position in accordance with the expansion and contraction of the wire.

This change in length of the wire is controlled by varying the operating temperature of the wire by means of a heat dissipating member which is actuated into and out of heat dissipating relation with the wire by a sensitive bellows or its equivalent which is connected to a pressure differential device so as to be responsive to variations in pressure differential caused by changes in air flow conditions over the upper surface of the wing. The wire is so selected and the mechanism so designed that the expansible wire is operated at such a temperature that a minimum amount of heat is lost by radiation (for which amount the position of the bar does not matter) but that most of the heat flow away from the wire is accomplished by actual bar wire contact, that is by conduction.

The pressure differential device may be in the form of a blister or head mounted on the upper surface of the wing adjacent the trailing edge thereof and having an inlet opening in the front face thereof and an outlet opening in the top surface thereof. The control switch, expansible member, heat dissipating bar member, and its associated bellows are all enclosed in an airtight container or housing, the interior of which is connected to the inlet opening of the pressure differential device while the bellows is connected with the outlet opening thereof.

In one embodiment of my invention, the arrangement is such that, when the plane is under normal flight conditions and the pressure differential is at maximum value the bellows holds the heat dissipating member in engagement with the wire so that it operates at a low temperature and holds the control switch in its open position. Under an incipient stall condition, the pressure differential decreases to its minimum value which causes the heat dissipating member to be actuated out of engagement with the wire to increase the operating temperature of the wire. This permits the wire to expand or elongate to actuate or permit the control switch to be actuated to its closed position to energize the warning devices.

In another embodiment of my invention, the heat dissipating member is held out of engagement with or out of heat dissipating relation relative to the wire during normal flight conditions and actuated into engagement therewith under stalling and incipient stalling conditions.

Figure 1:
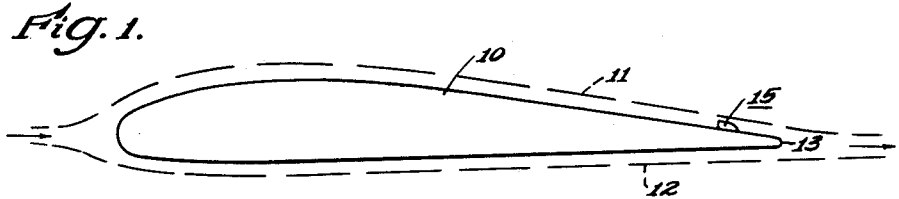
Figure 1 is a diagrammatic view showing the nature of the air flow over an airplane wing during normal flight conditions.
Figure 2:
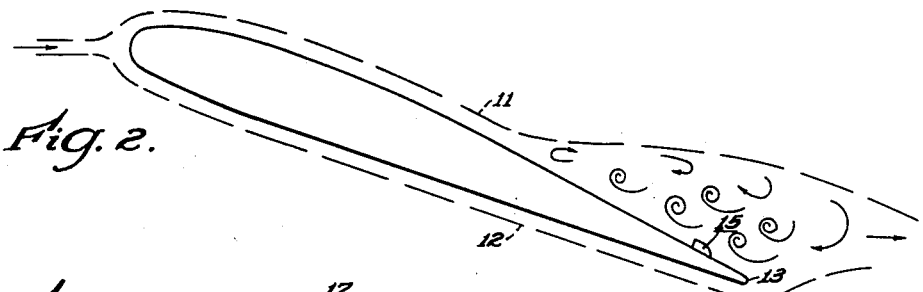
Fig. 2 is a similar view showing the nature of the air flow under an incipient stalling condition of the wing, showing in particular the turbulence of the air in the vicinity of the trailing edge of the wing.

Referring now to Figs. 1 and 2 of the drawing, there is shown in Fig. 1 a section of an airplane wing or airfoil 10 showing the direction of air flow thereover by means of the broken lines 11 and 12. It will be noted that the air flowing over the upper surface of the wing, in particular, is smooth or laminar, especially in the region of the trailing edge thereof.

Referring to Fig. 2, which shows the same wing disposed at an angle of attack which is approaching or in a stalling condition, it will be observed that the air flow in the region of the trailing edge 13 has changed to a turbulent flow, as indicated by the arrows. This change in the air flow conditions over the upper surface of the wing is made use of in my invention for the purpose of operating the warning devices.

Figure 3:
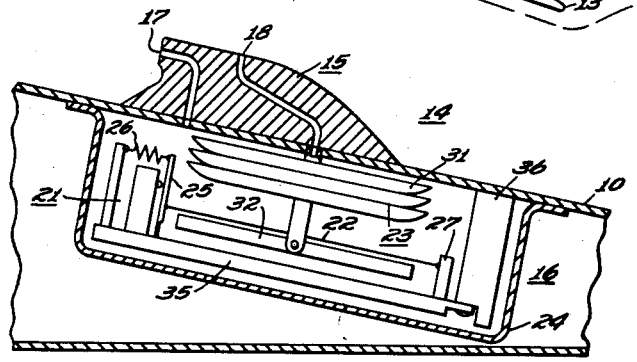
Fig. 3 is a side elevational view, partly in section, of a stall detecting device forming a part of the stall warning system of my invention.

Referring now to Fig. 3, there is shown a section of the wing 10 on which the stall detecting device 14, forming a part of my invention, is located. This device comprises, generally, a pressure differential device 15 and a switch device 16. The pressure differential device is shown in the form of a head adapted to be mounted on the upper surface of the wing near the trailing edge thereof in some such position as indicated in Figs. 1 and 2. In this instance, the head 15 is provided with a front inlet opening 17 and a top outlet opening 18, which are connected to openings in the base by tubular channels, as shown. This device functions in response to the flow of air thereover to produce a pressure differential which varies in accordance with the air conditions over the upper surface of the wing.

It is to be understood that any suitable type of pressure differential device may be utilized, so long as it functions to produce a pressure differential in accordance with the air flow conditions over the wing surface. The particular device illustrated herein is one of the three devices shown in my copending application, Serial No. 30,306, filed June 1, 1949, now Patent No. 2,590,521, dated March 25, 1952. Reference may be made to that application for a more complete description of the nature and operation of the pressure differential device 15.

The switch device 16 comprises, generally, a control switch 21, an expansible member in the form of a suitable wire 22, and a heat dissipating device 23 enclosed in an air-tight container or housing 24. In this instance, the housing is attached to the undersurface of the wing directly beneath the pressure differential device 15, although it is to be understood that it may be mounted as a separate element in some other position.

The control switch 21 may be of any suitable type, and, as shown, it is a single-pole double-throw switch having an operating member 25 which is biased to the left as viewed on the drawing by a spring 26. If desired, the operating member 25 may be in the form of a leaf spring to effect the same result.

The expansible wire 22 is connected at one end to the operating member 25 and to a suitable support 27 at its other end. The arrangement is such that when the wire 22 is operating at its normal temperature, that is, under normal conditions of flight, it is contracted in length to such a degree that the control switch 21 is held in its open position by the wire against the force exerted by the spring 26. When the operating temperature of the wire increases, it elongates to such an extent as to permit the switch 21 to be actuated to its closed position by the spring 26.

In order to provide for controlling the operating temperature of the wire 22 in accordance with change in air flow conditions, the heat dissipating device 23 is so constructed and arranged that it functions in response to changes in air flow conditions to vary the temperature of the wire by dissipating heat therefrom. The heat dissipating device may comprise a sensitive bellows 31 carrying a heat dissipating member 32 in the form of a bar, the surface of which is covered with suitable insulating material so as to electrically insulate the bar from the wire. It is to be understood that any other suitable device may be used instead of the bellows 31, such as a diaphragm of rubber, plastic, or the like.

As shown, the bar 32 is pivotally supported directly by the bellows beneath the wire 22, and the bellows is rigidly supported at its upper end. The opening in the upper end of the bellows is connected with the outlet opening 18 in the head, and since the inlet opening in the head 17 is connected to the interior of the housing, the bellows will contract and expand in accordance with variations in pressure differential and thereby actuate the bar 32 into and out of engagement with the wire 22.

In this instance, the wire 22 is continuously heated by passing a heating current therethrough, and under normal flight conditions, the bellows 31 is contracted and holds the bar 32 into engagement with the wire. The wire operates at a relatively low temperature and is contracted in length.

As the stalling condition of the wing is approached, the pressure differential decreases and the bellows 31 expands and disengages the bar from the wire which permits the operating temperature of the wire to increase. This causes the wire to elongate and the control switch 21 to close, completing the warning circuit.

As shown, the control switch 21 and the support 27 for the wire 22 are mounted upon a single support member or bar 35 which is supported at one end only by a suitable bracket 36. The bar 35 may be composed of material or materials having substantially the same coefficient of expansion as the wire 22. This provides for compensating for changes in ambient temperature to which the device is subjected so as to maintain the proper tension on the wire 22. Furthermore, by making the deflection of the bar 35 at the point near its support 36 the same as the movement of the bar 32 and the bellows 31 caused by changes in the position of the plane, the operation of the system is not affected by changes in gravitational forces due to changes in the position of the plane.

Figure 4:
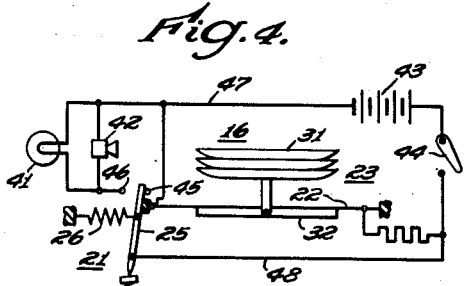
Fig. 4 is a diagrammatic view of the stall warning system of my invention embodying the stall detecting device of Fig. 3, showing how it is employed to control the signalling or warning devices in response to changes in pressure differential.

Referring now to Fig. 4, which is a diagrammatic view of one embodiment of the stall warning system of my invention, and in which the switch device 16 of Fig. 3 is shown in diagrammatic form, it will be observed that the system comprises an indicating lamp 41, and an electrically-operated horn 42 both connected to be energized by a battery 43 or other suitable current source on the plane. A main control switch 44 is provided for turning the apparatus on and off.

The control switch 21 is shown as a single-pole double-throw snap-acting switch, the movable element of which is biased in one direction by the spring 26 and disposed to be actuated in the other direction by the expansible wire 22. When the system is deenergized or when the wire 22 is operating at its low temperature, the movable element of the switch 21 is in the right-hand position, as shown against the stop member 45 so that the energizing circuit for the lamp 41 and horn 42 is open at contact member 46.

It will be apparent that, when the main control switch 44 is closed so as to complete the energizing circuits and the plane is flying under normal flight conditions, the heat dissipating bar 32 is held in engagement with the wire 22 so that the control switch 21 is held in its open position. When an incipient stalling condition results, the bar 32 is moved out of engagement with the wire so that its operating temperature increases, and the movable element of the switch is snapped into its closed position in engagement with contact member 46. This completes an obvious energizing circuit for the lamp 41 and horn 42 extending from the negative pole of the battery through conductor 47, the lamp 41 and horn 42 in parallel, switch 21 and conductor 48 and control switch 44 to the positive pole of the battery.

It will be noted that the wire 22 is continuously energized from the battery so long as the main control switch 44 is closed, regardless of the position of the control switch 21. Accordingly, the warning signal will be given so long as the stalling condition exists. As soon, however, as the stalling condition ceases to exist, the bar 32 will again be actuated into engagement with the wire 22 so that it will be cooled to such an extent as to actuate the control switch to its open position.

It will be understood that in the event there is a failure of the switch device 16, such, for example, as the breakage of the wire 22, the control switch 21 will be automatically operated to its closed position so as to warn the pilot of such failure. The same result will be had if there is some failure of the pressure differential device 15 so as to lose or materially reduce the pressure differential produced thereby. This will permit the bar 32 to drop or disengage the wire 22, even though operating under normal flight conditions, which, in turn, will cause the wire 22 to elongate to permit the control switch 21 to close the energizing circuit for the warning devices.

Figure 5:
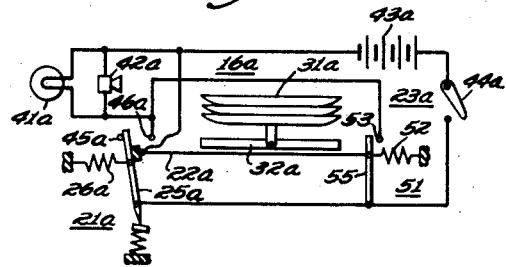
Fig. 5 is a similar view of another embodiment of my stall warning system employing a modified switch device.

Referring to Fig. 5, which shows another embodiment of my stall warning system, it will be observed that in this instance the heat dissipating member or bar 32a is mounted above the expansible wire 22a so that under normal flight conditions the bar is held out of engagement or heat dissipating relation with the wire as shown. This causes the wire to operate at a relatively high temperature and to be elongated so that the control switch 21a is held open by its biasing spring 26a. That is, the movable element 25a is held against the stop 45a. As soon, however, as a stalling condition results the bellows 31a expands to move the bar 32a into heat dissipating relation with the wire 22a which cools and contracts it to such extent as to actuate the control switch 21a to its closed position to energize the warning devices. That is, the movable element 25a is actuated into engagement with contact member 46a.

It will be understood that in this system the normal position of the control switch 21a is open. This results from the fact that the wire 22a is normally, i. e. under normal flight conditions, operated hot or at its maximum temperature. The wire is thus elongated and the biasing spring 26a of the control switch 21a holds the switch open.

Accordingly, it will be apparent that if the wire 22a should break or become permanently elongated the system or actually the switch device 16a would fail in the wrong sense and not warn the pilot of the failure.

In order to provide for effecting the operation of the warning devices under such conditions, the switch device is provided with an auxiliary control switch 51 having a biasing spring 52 which would normally actuate the movable element 55 into engagement with contact member 53 if it were not for the pull of the wire 22a which is connected to the movable element or armature 55 of the switch.

In this arrangement the pull or force on spring 52 is equal to that of spring 26a, but the former is stiffer, i. e. it has a higher spring constant, so that the major portion of the elongation of the wire 22a is made to actuate the main control switch 21a. When, however, the wire 22a breaks or becomes permanently elongated so that the main control switch 21a remains in the open position, the auxiliary control switch 51 is closed to energize the warning devices through an obvious energizing circuit.

It is obvious that the pressure differential from the head is supplied to the bellows or diaphragm and causes it to function in the same manner in this embodiment as for the previously described scheme of which Fig. 3 is illustrative.

It will be apparent that by employing the principle of heat dissipation or heat transfer for controlling the operating temperature of the expansible wire and thus the operating position of the control switch, the reliability of the stall warning system is greatly increased because the contact operating force is actually amplified to the point where it is considered reliable. This is obtained by taking an amount of electrical energy from the battery or other current source on the plane for heating the expansible wire sufficient to operate a high capacity switch.

The switch device functions reliably under adverse conditions, such as excessive vibration, due to the inherent thermal lag of the expansible wire which supplies an ideal damping force or factor tending to prevent false operation, even though the sensitive bellows or other pressure responsive device which carries the heat dissipating member may vibrate easily.

Since these devices operate with the expansible wire continuously energized or heated and its operating temperature is controlled by dissipating heat therefrom, all electrical contact members in the energizing or heating circuit of the expansible wire have been eliminated. This reduces the probability of failure of the devices and provides an extremely reliable control device having a high degree of sensitivity.

In view of the foregoing description of a preferred embodiment of my invention, it will be apparent that I have provided a stall warning system and devices for use therein which are of simple and economical construction and extremely reliable and effective under widely varying operating conditions. The stall detecting devices of my invention may be utilized in any stall warning system for controlling the warning devices in which a suitable source of pressure differential is available.

The stall warning systems may be used on any airplane subject to stalling conditions and will reliably function to provide the pilot with adequate warning of any incipient stalling condition.

While I have shown concrete embodiments of my invention and described it in detail, it is to be understood that the principles of my invention may be embodied in other mechanical and electrical forms without departing from the spirit of the invention.

I claim as my invention:

1. A stall detector adapted to be mounted on the wing of an airplane to operate an electrically-operated warning device on the plane comprising, means adapted to be mounted upon the upper surface of the wing for producing a pressure differential in accordance with the conditions of air flow over said wing surface, a control switch for controlling the energization of the warning device, an electro-thermal responsive device for actuating the control switch, and heat dissipating means actuated by the pressure differential produced by said pressure differential producing means for controlling the electrothermal responsive means.

2. A stall detector adapted to be mounted on the wing of an airplane to operate an electrically-operated warning device on the plane comprising, means adapted to be mounted upon the upper surface of the wing for producing a pressure differential in accordance with the conditions of air flow over said wing surface, a control switch for controlling the energization of the warning device, a continuously heated expansible wire connected to hold the control switch in its open or closed position depending upon the operating temperature of the wire, and means responsive to the pressure differential produced by said pressure differential producing means, including a heat dissipating member actuated out of engagement with the wire under normal flight conditions and into heat dissipating relation with the wire under stalling conditions, thereby to so control the operating temperature of the wire as to cause the control switch to close only under stalling conditions.

3. A stall detector adapted to be mounted on the wing of an airplane to operate an electrically-operated warning device on the plane comprising, means adapted to be mounted upon the upper surface of the wing for producing a pressure differential in accordance with the conditions of air flow over said wing surface, a control switch for controlling the energization of the warning device, an expansible wire mechanically connected to actuate said switch to one or another of its open and closed positions dependent upon the operating temperature of the wire, circuit means for supplying heating current to the wire so that it is continuously subjected to the flow of heating current, a sensitive bellows device connected to be responsive to the pressure differential produced by the means for producing such pressure differential, and an insulated heat dissipating bar carried by the bellows and disposed to be actuated into and out of engagement with the wire, thereby to control the operating temperature of the wire in accordance with pressure differential and air flow conditions over the upper surface of the wing.

4. A stall detector adapted to be mounted on the wing of an airplane to operate an electrically-operated warning device on the plane comprising, means adapted to be mounted upon the upper surface of the wing for producing a pressure differential in accordance with the conditions of air flow of said wing surface, a control switch for controlling the energization of the warning device, a continuously heated expansible wire connected to actuate the control switch to its open or closed position depending upon the operating temperature of the wire, a bellows device connected to be responsive to the pressure differential of the means for producing a pressure differential, and a heat dissipating member disposed to be actuated in and out of heat dissipating relation with the wire by the bellows device, said bellows device functioning under normal flight conditions of the wing to hold the heat dissipating member in heat dissipating relation with the wire to cause the wire to operate at a relatively low temperature and hold the control switch open and to actuate the heat dissipating member out of heat dissipating relation with the wire under an incipient stalling condition to increase the operating temperature of the wire to effect the closure of the control switch.

5. A switching device for use in stall warning systems for airplanes with a device mounted on the upper surface of a wing to produce a pressure differential in accordance with air flow conditions over said upper surface of the wing for controlling an electrically-operated warning device comprising, a control switch for the warning device, an expansible member connected to mechanically actuate the control switch to its open or closed position depending upon the operating temperature of said member, said member being continuously heated, and means responsive to a pressure differential including a heat dissipating member for controlling the operating temperature of the expansible member in accordance with the pressure differential produced by said device mounted on the upper surface of the wing.

6. A switch device for use on airplanes in stall warning systems for controlling the operation of an electrically-operated warning device in accordance with variations in pressure differential produced by a device mounted on a wing of the plane comprising, a control switch, a continuously heated expansible wire connected to mechanically actuate the control switch, and heat dissipating means including means responsive to variations in pressure differential produced by said device mounted on a wing of the plane operable to control the operating temperature of the wire.

7. A switch device for use on airplanes in stall warning systems for controlling the operation of an electrically-operated warning device in accordance with variations in pressure differential produced by a device mounted on a wing of the plane comprising, a control switch, a continuously heated expansible wire connected to mechanically actuate the control switch, a sensitive bellows device connected to be responsive to variations in said pressure differential, and an insulated heat dissipating member carried by the bellows to be actuated into and out of heat dissipating relation with the wire for controlling the operating temperature thereof.

8. Control means comprising, a control switch, an elongated self-heated thermally responsive member connected to mechanically actuate the control switch in response to changes in temperature thereof, means including an elongated heat dissipating member extending in spaced substantially parallel relation with said thermally responsive member, said heat dissipating member being mounted for movement laterally into and out of heat dissipating relation with the thermally responsive member for controlling the operating temperature of the thermally responsive member to cause it to selectively control the position of the control switch, and operating means for moving said heat dissipating member.

9. Control means comprising, a control switch, means including an elongated continuously self-heated expansible member operable in response to a predetermined increase in the operating temperature thereof to effect the closure of the control switch, and means including an elongated heat dissipating member extending in substantially parallel spaced relation to said expansible member, said heat dissipating member being mounted for movement laterally toward and away from heat dissipating relation with the expansible member, and operating means for moving said heat dissipating member.

10. Control means comprising, a control switch, said switch having contact members normally biased to closed position, an expansible wire connected to actuate the control switch, said wire being effective when contracted to actuate the control switch to its open position and effective when elongated to permit the control switch to move to its closed position, an energizing circuit for continuously and directly heating the wire, a heat dissipating member disposed adjacent the wire effective when moved into engagement with the wire to effect its cooling and contraction to such extent as to actuate the control switch to its open position, and operating means for actuating the heat dissipating member into and out of engagement with the wire to effect operation of the control switch.

11. Control means comprising, a control switch, said switch having contact members normally biased to closed position, an expansible wire connected to actuate the control switch, said wire being effective when contracted to actuate the control switch to its open position and effective when elongated to permit the control switch to move to its closed position, an energizing circuit for continuously heating the wire, a heat dissipating member disposed adjacent the wire effective when moved into engagement with the wire to effect its cooling and contraction to such extent as to actuate the control switch to its open position, a pressure sensitive bellows device for supporting the heat dissipating member, whereby in response to pressure variations the bellows moves the heat dissipating member into engagement with the wire to maintain it in a cooled and contracted condition and away from the wire to permit the temperature of the wire to increase and expand to cause the control switch to close.

12. A control device comprising, a control switch, an electrically-heated expansible wire disposed to actuate the control switch, said wire being normally heated and expanded, means including an elongated movably mounted heat dissipating member for varying the operating temperature of the wire to effect the operation of the control switch by the contraction of the wire when moved away from the wire, and said member mounted generally parallel to said wire for movement laterally toward and away from the wire.

13. A control device comprising, a control switch, a continuously heated expansible wire connected to mechanically actuate the control switch, said wire being normally effective when heated and in an elongated position to cause the control switch to be in a predetermined operating position and effective when cooled and contracted to actuate the control switch to a different position, and means including a bellows actuated heat dissipating member responsive to pressure variations to actuate the control switch.

HOWARD E. DYCHE, Jr.

References Cited in the file of this patent
UNITED STATES PATENTS

| Number | Name | Date |
|---|---|---|
| 2,306,509 | Talmey | Dec. 29, 1942 |
| 2,356,847 | Holthe | Aug. 29, 1944 |
| 2,431,241 | Godsey, Jr. | Nov. 18, 1947 |
| 2,454,587 | Arnold | Nov. 23, 1948 |